United States Patent
Gonnocci

[11] Patent Number: 5,941,538
[45] Date of Patent: Aug. 24, 1999

[54] EQUALIZING CHUCK

[75] Inventor: Ralph J. Gonnocci, Rochester Hills, Mich.

[73] Assignee: Ralph J. Gonnocci Revocable Living Trust, Rochester, Mich.

[21] Appl. No.: 08/933,201

[22] Filed: Sep. 18, 1997

[51] Int. Cl.⁶ ..................................................... B23B 5/22
[52] U.S. Cl. ........................................ 279/132; 279/137
[58] Field of Search ..................................... 279/137, 132

[56] References Cited

U.S. PATENT DOCUMENTS

| | | |
|---|---|---|
| 2,613,943 | 10/1952 | Trudeau . |
| 2,722,427 | 11/1955 | Labeyrie . |
| 3,069,181 | 12/1962 | Hohwart et al. . |
| 3,131,948 | 5/1964 | Buck . |
| 3,233,908 | 2/1966 | Schwarzmayr et al. . |
| 3,267,580 | 8/1966 | Hohwart et al. . |
| 3,365,206 | 1/1968 | Hohwart et al. ........................ 279/106 |
| 3,423,098 | 1/1969 | Hohwart et al. . |
| 3,472,526 | 10/1969 | Hohwart . |
| 3,604,717 | 9/1971 | Hohwart ................................. 279/137 |
| 3,945,652 | 3/1976 | Hohwart et al. . |
| 4,215,605 | 8/1980 | Toth et al. . |
| 4,465,289 | 8/1984 | Banks . |
| 4,497,499 | 2/1985 | Allen ...................................... 279/137 |
| 4,569,530 | 2/1986 | Cross . |
| 4,679,802 | 7/1987 | Beal . |
| 5,184,833 | 2/1993 | Cross et al. . |
| 5,322,305 | 6/1994 | Cross et al. . |
| 5,409,242 | 4/1995 | Gonnocci . |

FOREIGN PATENT DOCUMENTS 236623  7/1945  Switzerland .

*Primary Examiner*—Daniel W. Howell
*Assistant Examiner*—Monica Smith
*Attorney, Agent, or Firm*—Bliss McGlynn, P.C.

[57] ABSTRACT

An equalizing chuck includes a body, a plurality of work engaging jaws, and a plurality of rocker arms carrying the jaws. The rocker arms extends axially along an axis and have a mounting portion at one axial end for the jaws and an end portion at the other axial end. The equalizing chuck also includes a plurality of swivel mountings connecting the rocker arms to the body, a plurality of slide members receiving the end portions of the rocker arms, a reciprocal actuator disposed centrally of the rocker arms, and a plurality of segments slidably secured to the actuator. The segments are operative to move in a radial manner with respect to a centerline of the body and operatively cooperate with the slide members such that reciprocatory movement of the actuator moves the segments and correspondingly the slide members to move the jaws relative to each other. The equalizing chuck also includes a plurality of bearings positioned between the segments and the body wherein engagement of a workpiece by a set of jaws causes relative radial movement between adjacent segments until a pressure exerted on the workpiece by the work engaging jaws is equalized.

16 Claims, 2 Drawing Sheets

EQUALIZING CHUCK

BACKGROUND OF THE INVENTION

1. Field of the Invention

The present invention relates generally to chucks and, more particularly, to an equalizing chuck.

2. Description of the Related Art

Work holding chucks having a plurality of radially shiftable segments that act to operate a plurality of work holding jaws through rocker arms are known as disclosed in U.S. Pat. No. 3,365,206. Such chucks are typically used for fragile or thin walled parts or for compensating for issues of roundness. These chucks may include a plurality of wedge-shaped members positioned within the body of the chuck and engaging lower sections of the rocker arms. A flexible band or spring surrounds the wedge-shaped members. An actuator is secured within the chuck for axial travel. Axial travel of the actuator causes outward movement of the wedge-shaped members which correspondingly drive the lower sections of the rocker arms outward causing the rocker arms to pivot and urge the jaws inward.

If the jaws simultaneously grip the workpiece, the wedge-shaped members engaging the actuator are not displaced and the gripping force applied by each set of jaws is relatively constant. If one pair of opposite jaws engage the workpiece first, the corresponding wedge member then begins to slide inward. As the wedge member slides inward, it drives an adjacent wedge outward, thus increasing the distance the adjacent jaw travels. As discussed, the wedges are held in position by the flexible band which distorts when the wedges move. However, the use of such a spring or flexible band decreases the sensitivity of the equalizing chuck. For instance, the wedges must overcome the spring force in order to equalize. Furthermore, the band must be of sufficient strength to overcome any centrifugal force during operation of the chuck. It is recognized that the centrifugal force would act to throw the wedges outward, thus increasing the clamping force and possibly damaging the workpiece.

SUMMARY OF THE INVENTION

It is, therefore, one object of the present invention to provide an equalizing chuck with increased sensitivity during clamping of a workpiece in the chuck.

It is also an object of the present invention to provide an equalizing chuck with increased resistance to centrifugal forces.

To achieve the foregoing objects, the present invention is an equalizing chuck including a body, a plurality of work engaging jaws, and a plurality of rocker arms carrying the jaws. The rocker arms extend axially along an axis and have a mounting portion at one axial end for the jaws and an end portion at the other axial end. The equalizing chuck also includes a plurality of swivel mountings connecting the rocker arms to the body, a plurality of slide members receiving the end portions of the rocker arms, a reciprocal actuator disposed centrally of the rocker arms, and a plurality of segments slidably secured to the actuator. The segments are operative to move in a radial manner with respect to a centerline of the body and operatively cooperating with the slide members such that reciprocatory movement of the actuator moves the segments and correspondingly the slide members to move the jaws relative to each other. The equalizing chuck further includes a plurality of bearings positioned between the segments and the body wherein engagement of a workpiece by a set of jaws causes relative radially movement between adjacent segments until a pressure exerted on the workpiece by the work engaging jaws is equalized.

One advantage of the present invention is that an equalizing chuck is provided that has adjacent segments cooperating with a bearing such that radial movement of one segment is transmitted to an adjacent segment through the bearing. Another advantage of the present invention is that the equalizing chuck has a bearing that positively supports the segment on the body of the chuck.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
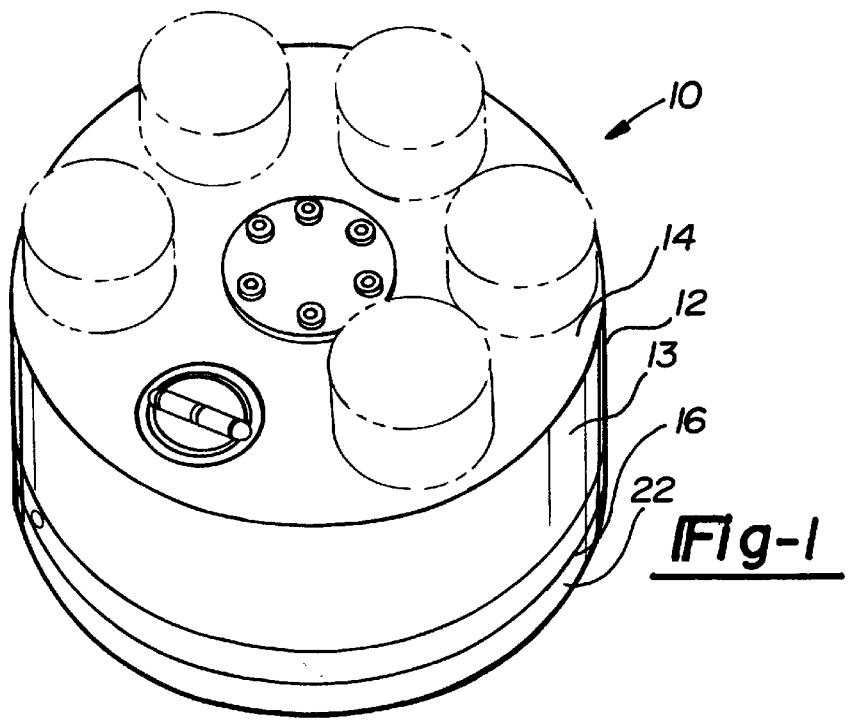
FIG. 1 is a perspective view of an equalizing chuck according to the present invention.
Figure 2:
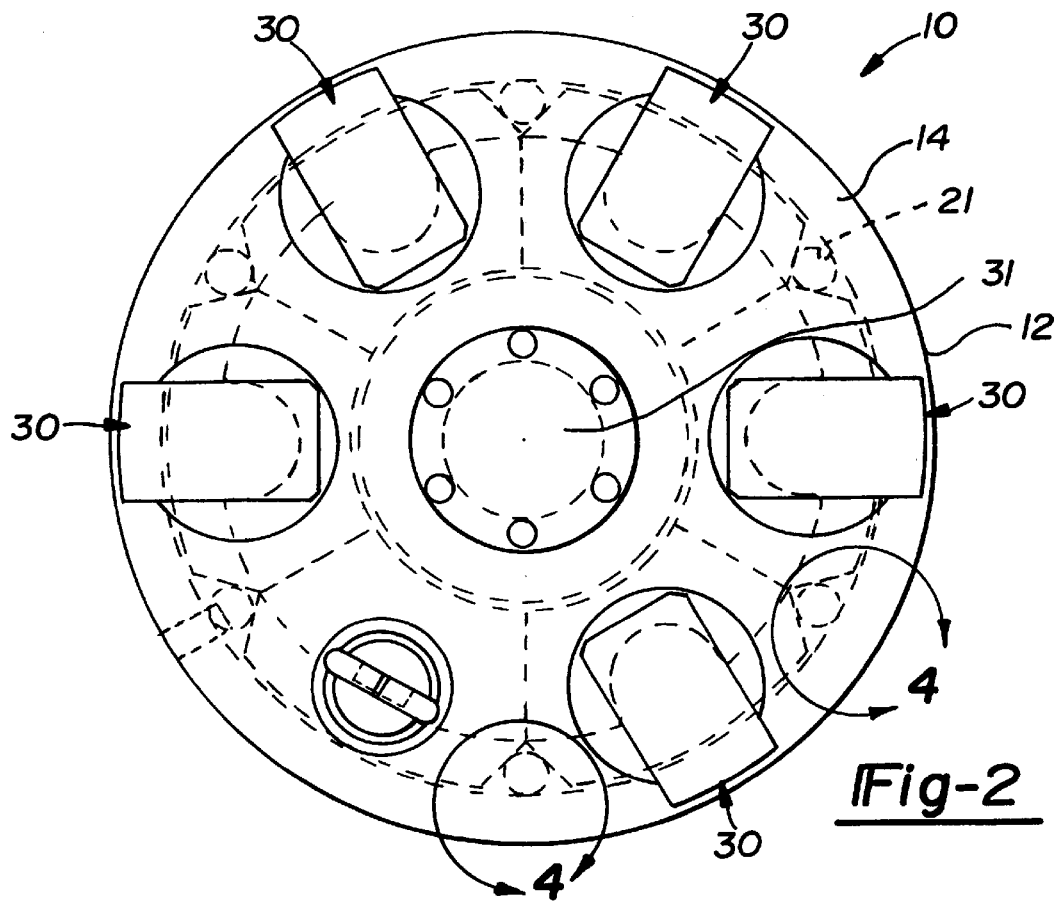
FIG. 2 is a plan view of the equalizing chuck of FIG. 1 illustrating a jaw removed.
Figure 3:
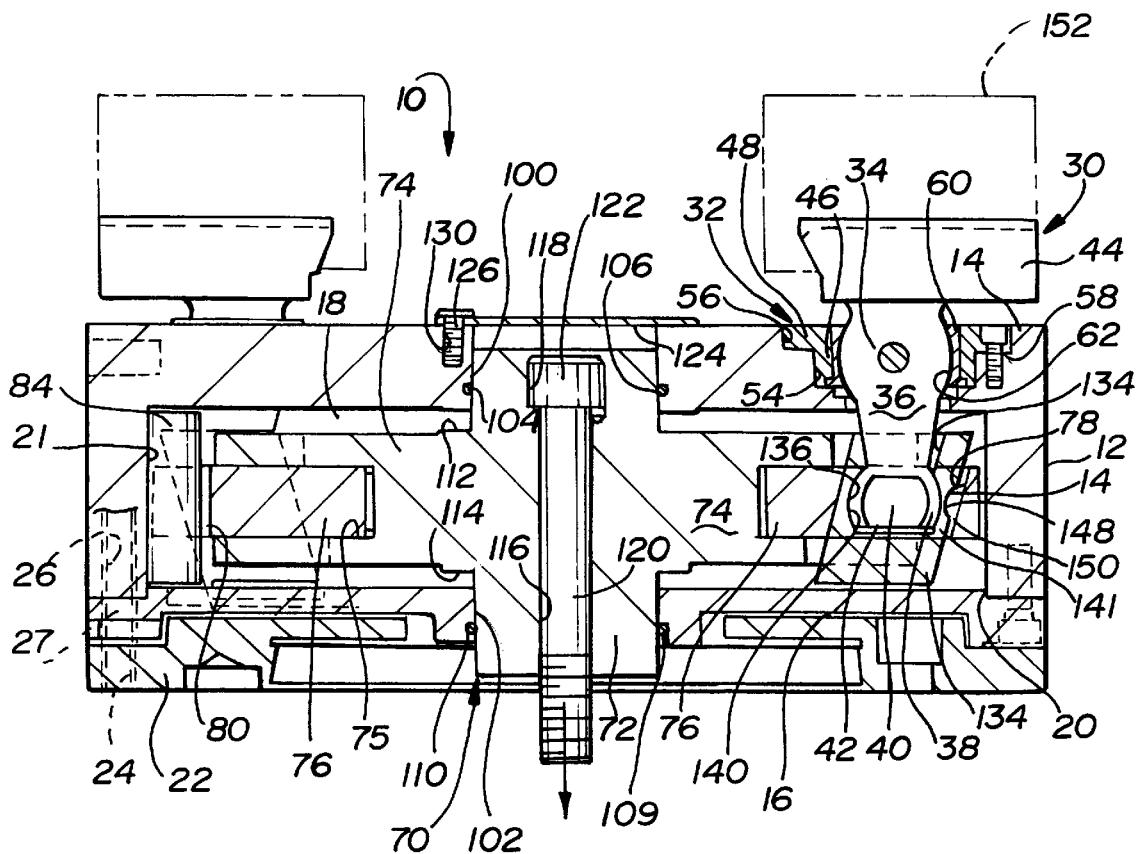
FIG. 3 is a sectional view taken along line 3—3 of FIG. 2.

Referring to FIGS. 1 through 4, an equalizing chuck 10, according to the present invention, is shown. The equalizing chuck 10 includes a body 12 that is generally cylindrical in shape. The body 12 is made, preferably, of a metal material. The body 12 has an outer circular peripheral surface 13, radial front face 14, radial rear face 16 and cavity 18 (FIG. 3) in the interior of the body 12 which is cored out or recessed to accommodate other parts of the equalizing chuck 10. As illustrated in FIG. 3, the cavity 18 has an opening 20 through the rear face 16 and an inner circumferential surface 21.

The equalizing chuck 10 also includes an adapter plate 22 which is partially recessed into the body 12 and closes the opening 20. The adapter plate 22 is generally cylindrical in shape and has a plurality of apertures 24 extending axially therethrough and adapted to match corresponding internally threaded apertures 26 in the body 12. Fasteners 27 such as screws extend through the apertures 24 and threadably engage the threaded apertures 26 to hold the adapter plate 22 fixedly but detachably fastened to the body 12. It should be appreciated that the adapter plate 22 may be adapted for mounting on the front of a machine spindle (not shown). It should also be appreciated that the adapter plate 22 may be of any suitable shape or design to fit any particular machine or spindle and may vary from one machine to another.

The equalizing chuck 10 includes a plurality of rocker arms, generally indicated at 30. In the preferred embodiment, six (6) rocker arms 30 are spaced equidistantly with respect to each other and from a central axis 31 of the equalizing chuck 10. The rocker arms 30 extend axially through the front face 14 of the body 12 and into the cavity 18. Each rocker arm 30 is attached to the body 12 by a swivel mounting, generally indicated at 32, to be described.

The rocker arm 30 has a ball portion 34 which is generally spherically shaped and a tapered portion 36 which tapers longitudinally to an end portion 38. The end portion 38 is generally spherically shaped with a pair of opposed flat or planar outer surfaces 40 and a flat or planar bottom surface 42. The rocker arm 30 also has a mounting portion 44 to be described extending longitudinally from the ball portion 34 forwardly of the front face 14 of the body 12.

The swivel mounting 32 includes a tubular mounting member 46. The mounting member 46 is disposed in a cavity 54 of the body 12. The cavity 54 has an enlarged opening 56 in the front face 14. A front flange 48 of the tubular mounting member 46 is adapted to abut a shoulder 58 forming the enlarged opening 56. It should be appreciated that the rocker arm 30 extends through the enlarged opening 56 and cavity 54.

The swivel mounting 32 also includes a tubular bearing member 60 disposed within the mounting member 46. The bearing member 60 has an arcuate interior surface 62 to matingly engage or contact the outer surface of the ball portion 34. The bearing member 60 is, preferably, a single fracture split member disposed about the ball portion 34 of the rocker arm 30. It should be appreciated that the outer surface of the ball portion 34 pivots on the interior surface 62 of the bearing member 60.

The equalizing chuck 10 includes an actuator, generally indicated at 70, to pivot or rock the rocker arms 30. The actuator 70 has a journal 72 and a plurality of arm or lobe portions 74 extending radially from the journal 72. Preferably, six lobe portions 74 are equally circumferentially spaced about the journal 72. Each lobe portion 74 includes a slot 75 receiving a wedge or pie shaped segment 76 slidably supported for radial movement with respect to the centerline 31 of the equalizing chuck 10. Each of the wedge-shaped segments 76 have a radially outwardly extending inclined aperture 78 for a function to be described.

Figure 4:
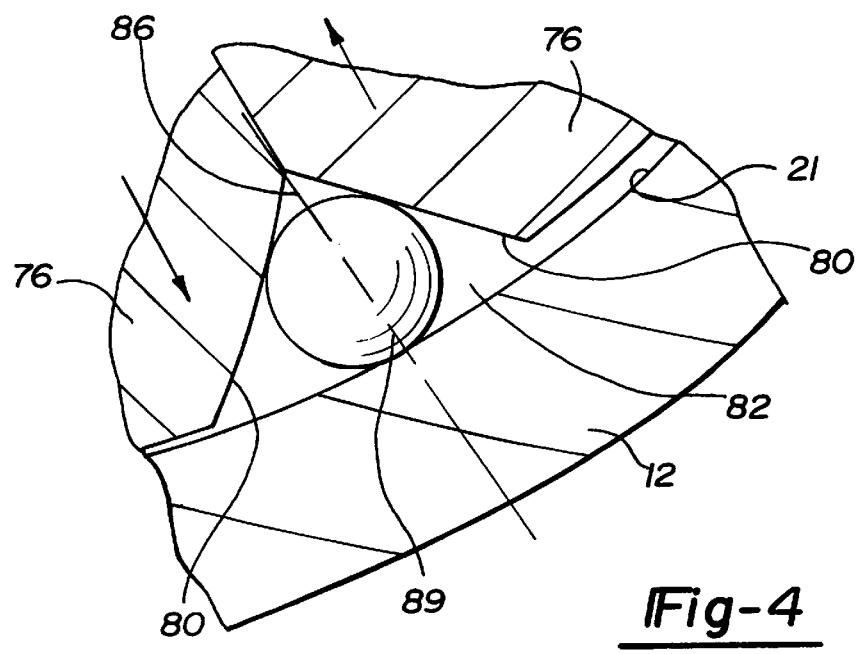
FIG. 4 is an enlarged view of the area set forth in circle 4—4 of FIG. 2.

As illustrated in FIGS. 2 through 4, the segments 76 are spaced from the inner circumferential surface 21 of the cavity 18. The radially outward corners 80 of the segments 76 are beveled at a predetermined angle such as forty-five degrees (45°) such that the corners 80 of adjacent segments 76 meet and define a V-shaped opening or gap 82. The beveled surface of the corner 80 may be either curvlinear or linear depending upon the amount of control or regulation of displacement of adjacent segments 76. A bearing 84 is placed in the V-shaped opening 82 and contacts both the inner circumferential surface 21 of the cavity 18 and each of the beveled corners 80 of adjacent segments 76. It should be appreciated that each of the segments 76 is positively supported by the inner circumferential surface 21 of the equalizing chuck 10. Any outward or centrifugal force generated by rotation of the equalizing chuck 10 is transmitted through the bearings 84 to the body 12 of the equalizing chuck 10. As set forth more fully below, during operation of the equalizing chuck 10, the bearing 84 also cooperates with the segments 76 and the inner circumferential surface 21 of the cavity 18 to equalize the forces applied by work engaging jaws 152 to be described. It should be appreciated that various means could be used to restrict at least one segment 76.

The journal 72 is disposed and slidably received in apertures 100 and 102 provided centrally in the front face 14 and the rear face 16 of the body 12. A seal 104 such as an O-ring is disposed in a groove 106 about the opening 100 in the front face 14 and a seal 109 such as an O-ring is disposed in a groove 110 about the opening 102 in the rear face 16 to directly contact the journal 72. The actuator 70 is guided for reciprocatory travel in both directions by the apertures 100 and 102 and is limited by front and rear abutments 112 and 114 on the lobe portions 74. It will be appreciated that the front abutment 112 seats against the bottom of the aperture 100 when the actuator 70 is at the forward limit of its travel and that the rear abutment 114 seats against the top of the rear opening 102 in the rear face 16 when the actuator 70 is at the rearward limit of its travel. It should be appreciated that the rear abutment 114 may not seat against the rear face 16 when a workpiece is disposed in the equalizing chuck 10.

The actuator 70 includes an aperture 116 extending axially through the journal 72 and having a countersink 118 at the forward end thereof to accept a machine screw 120 having a head 122 disposed in the countersink 118. It should be appreciated that the machine screw 120 connects the actuator 70 to a drawbar (not shown) disposed within the spindle. It should also be appreciated that suitable breather vents (not shown) are provided to prevent build up of pressure forward of the journal 72.

The equalizing chuck 10 further includes a cap 124 mounted centrally about the opening 100 in the front face 14 of the body 12. The cap 124 is fixedly but detachably fastened to the body 12 by fasteners 126 such as screws. The fasteners 126 extend through apertures in the cap 124 and threadably engage corresponding internally threaded apertures 130 in the body 12 such that the cap 124 covers the aperture 100 and protects the journal 72. The cap 124 may be formed with an internal pocket or recess which coincides with the aperture 100 and progressively receives the journal 72 as the actuator 70 moves forwardly to the forward limit of its travel. The journal 72 extends entirely through the adapter plate 22 and into the spindle for convenient attachment to the drawbar. Although the actuator 70 is intended for attachment to a mechanical drive such as the drawbar of a machine tool, it can easily be adapted for hydraulic or pneumatic operation.

The equalizing chuck 10 also includes a power cylinder or slide member 134 connected to each of the rocker arms 30. The slide member 134 is generally cylindrical in shape. The slide member 134 is inclined and adapted to mate with the inclined aperture 78 of the segments 76. The slide member 134 has a cavity 136 with an enlarged tapered opening 138 at a front end thereof. The cavity 136 has an arcuate interior surface 140 having a planar or flat side surfaces (not shown). The end portion 38 is inserted into the cavity 136 of the slide member 134 and rotated such that the arcuate outer surface of the end portion 38 matingly engages or contacts the interior surface 140 of the cavity 136. The slide member 134 also has a groove or key way 144 circumferentially about the outer periphery thereof which is generally arcuate in shape. A key 146 has an arcuate portion 148 disposed in the key way 144 and extending partially circumferentially therealong. The key 146 also has a planar portion 150 which abuts the surface of the opening 78. The key 146 prevents the slide member 134 from rotating and disengaging the end portion 38 of the rocker arm 30. It should be appreciated that the end portion 38 rotates along the interior surface 140 of the slide member 134.

The equalizing chuck 10 further a work engaging jaw 152 for each rocker arm 30. The jaw 152 maybe cylindrical or rectangular in shape. The jaw 152 is mounted on the mounting portion 44 of the rocker arm 30. The specific structure of the mounting mechanism for securing the jaw 152 to the mounting portion 44 is not further described in detail since any one of the numerous well known designs could be used with the present invention.

In operation, the actuator 70 moves between first and second operable positions. In the first position, the actuator 70 is located or placed at the top of the cavity 18 nearest the cap 124. In this position, the end portion 38 of the rocker arm 30 is drawn radially inward and correspondingly the jaws 152 are urged radially outward. Thus, the jaws 152 are placed in an open or unlocked position. Once a workpiece (not shown) is loaded in the jaws 152, the actuator 70 is drawn downward toward the rear face 16. As the actuator 70 is drawn downward, the outwardly extending inclined apertures 78 on the segments 76 cooperate with the slide member 134 to drive the slide member 134 radially outward. Radially outward movement of the slide member 134 pivots or rotates the end of the rocker arm 30 which in turn pivots the rocker arm 30 such that the mounting portion 44 and corresponding jaw 152 are urged radially inward to clamp the workpiece.

As set forth above, the segments 76 are slidably positioned on the lobes 74 of the actuator 70 to provide a mechanism to equalize the force applied by the clamping jaws 152. During clamping, it is desirable to have each set or pair of jaws 152 applied roughly the same clamping force. The present invention provides such a mechanism. Using a cylindrical workpiece as an example, if the workpiece is out of round, one pair of jaws 152 would engage the workpiece first. If the distance of travel for each of the respective pairs of jaws 152 were fixed, the pair initially contacting the workpiece would apply the most pressure and subsequent pairs of jaws 152 may not even contact the workpiece. Additionally, should the workpiece be relatively thin walled, it would be possible for such increased pressure to crush the workpiece. Thus, the present invention provides the slidable segments 76 attached to the lobes 74 of the actuator 70.

In operation, if one pair of clamping jaws 152 contacts the workpiece, the actuator 70 continues to travel downward, in a direction shown by the arrow, its fall stroke while the segment 76 slides within the slot 75 on the lobe 74. In order to equalize the jaws 152, as one segment 76 remains stationary, the adjacent segment 76, which has not contacted the workpiece with sufficient pressure, continues to move outward. As illustrated in FIG. 4, the adjacent segments 76 move relative to one another. As adjacent segments 76 move radially the bearing 84 moves laterally in position relative to a centerline or interface 86 of adjacent segments 76. Thus, should one segment 76 stop prior to an adjacent segment 76, the adjacent segment 76 is pushed further radially outward, thus shifting the bearing 84 from the centerline 86. It should be appreciated that the bearing 84 continues to support adjacent segments 76 against the inner circumferential surface 21 of the equalizing chuck 10. Once the relative pressure from each of the pairs of jaws 152 equalizes, the bearing 84 will remain stationary and the actuator 70 may finish its travel to provide equal clamping pressure on the workpiece. It should be appreciated that such an apparatus provides a clamping chuck that positively supports the members of the chuck while allowing for equalization of the clamping forces exerted by the chuck.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An equalizing chuck comprising:
   a body;
   a plurality of work engaging jaws;
   a plurality of rocker arms carrying said jaws, said rocker arms extending axially along an axis, said rocker arms having a mounting portion at one axial end for said jaws and an end portion at the other axial end;
   a plurality of swivel mountings connecting said rocker arms to said body;
   a plurality of slide members receiving said end portions of said rocker arms;
   a reciprocal actuator disposed centrally of said rocker arms;
   a plurality of wedge-shaded segments slidably secured to said actuator, said segments having radially outward corners being beveled such that corners of adjacent segments cooperate to form an indentation, said segment being operative to move in a radial manner with respect to a centerline of said body, said segments operatively cooperating with said slide members such that reciprocatory movement of said actuator moves said segments and correspondingly said slide members to move said jaws relative to each other; and
   a plurality of movable bearings having a curved outer shape, one of said bearings being positioned within said indentation between said segments and said body wherein engagement of a workpiece by a set of jaws causes relative radial movement between adjacent segments until a pressure exerted on the workpiece by said work engaging jaws is equalized.

2. An equalizing chuck as set forth in claim 1 wherein said segments include an aperture extending therethrough, and said slide member being disposed within said aperture.

3. An equalizing chuck as set forth in claim 2 wherein said slide member has an inclined surface.

4. An equalizing chuck as set forth in claim 3 wherein said aperture is inclined such that it receives and cooperates with said inclined slide member.

5. An equalizing chuck as set forth in claim 1 wherein said segments are radially shiftable with respect to adjacent segments.

6. An equalizing chuck comprising:
   a body;
   a plurality of work engaging jaws;
   a plurality of rocker arms carrying said jaws, said rocker arms extending axially along an axis, said rocker arms having a mounting portion at one axial end for said jaws and an end portion at the other axial end;
   a plurality of swivel mountings connecting said rocker arms to said body;
   a plurality of slide members receiving said end portions of said rocker arms;
   a reciprocal actuator disposed centrally of said rocker arms;
   a plurality of segments slidably secured to said actuator, said segments operative to move in a radial manner with respect to a centerline of said body, said segments operatively cooperating with said slide members such that reciprocatory movement of said actuator moves said segments and correspondingly said slide members to move said jaws relative to each other; and
   a plurality of bearings positioned between said segments and said body wherein engagement of a workpiece by a set of jaws causes relative radial movement between adjacent segments until a pressure exerted on the workpiece by said work engaging jaws is equalized;
   said segments being radially shiftable with respect to adjacent segments and are wedge-shaped, said segments having radially outward corners, said corners being beveled such that corners of adjacent segments cooperate to form a V-shaped indentation;

one of said bearings being positioned within said V-shaped indentation and engaging said adjacent segments, said bearing supporting said adjacent segments on said body; and wherein said bearing has an elongated cylindrical shape and said adjacent segments engage said bearing during axial travel of said segments.

7. An equalizing chuck as set forth in claim 6 wherein said bearing is operative to move along an inner circumferential surface of said body to maintain support of said segments despite relative radial displacement of adjacent segments.

8. An equalizing chuck as set forth in claim 1 wherein the angle of the bevel and the size of the bearing act to regulate the amount of displacement between adjacent segements.

9. An equalizing chuck as set forth in claim 8 wherein said bevel is linear.

10. An equalizing chuck as set forth in claim 8 wherein said bevel is curvlinear.

11. An equalizing chuck comprising:

a body;

a plurality of work engaging jaws;

a plurality of rocker arms carrying said jaws, said rocker arms extending axially along an axis, said rocker arms having a mounting portion at one axial end for said jaws and an end portion at the other axial end;

a plurality of swivel mountings connecting said rocker arms to said body;

a plurality of slide members receiving said end portions of said rocker arms;

a reciprocal actuator disposed centrally of said rocker arms;

a plurality of pie-shaped equalizing segments, said segments slidably secured to said actuator, said pie-shaped segments concentrically arranged about a common center for radial movement with respect to said common center, said pie-shaped segments further having outer corners removed wherein adjacent pie-shaped members cooperate to define a V-shaped opening extending outward away from said common center towards an inner circumferential surface of said chuck; and a bearing having a curved outer shape positioned in said V-shaped opening, said bearing contacting each of said adjacent pie-shaped segments and said inner circumferential surface of said body such that said actuator moves axially to actuate said clamping jaws until one of said pair of jaws engages a workpiece, as said actuator continues its travel, said adjacent segments may shift radially with respect to one another to move the adjacent jaws relative to one another.

12. An equalizing chuck comprising:

a body;

a plurality of work engaging jaws;

a plurality of rocker arms carrying said jaws, said rocker arms extending axially along an axis, said rocker arms having a mounting portion at one axial end for said jaws and an end portion at the other axial end;

a plurality of swivel mountings connecting said rocker arms to said body;

a plurality of slide members receiving said end portions of said rocker arms;

a reciprocal actuator disposed centrally of said rocker arms;

a plurality of pie-shaped equalizing segments, said segments slidably secured said actuator, said pie-shaped segments concentrically arranged about a common center for radial movement with respect to said common center, said pie-shaped segments further having outer corners removed wherein adjacent pie-shaped members cooperate to define a V-shaped opening extending outward away from said common center towards an inner circumferential surface of said chuck; and a bearing positioned in said V-shaped opening, said bearing contacting each of said adjacent pie-shaped segments and said inner circumferential surface of said body such that said actuator moves axially to actuate said clamping jaws until one of said pair of jaws engages a workpiece, as said actuator continues its travel, said adjacent segments may shift radially with respect to one another to move the adjacent jaws relative to one another; and wherein said bearing has an elongated cylindrical shape and said adjacent segments engage said bearing throughout axial travel of said actuator.

13. An equalizing chuck as set forth in claim 12 wherein said bearing is shiftable along the inner circumferential surface of said body with respect to independent shifting of adjacent segments such that said bearing continues to support said adjacent segements irrespective of said segments radial position.

14. An equalizing chuck as set forth in claim 13 wherein the angle of the V-shaped opening and the size of the bearing act to regulate the radial displacement of adjacent segments.

15. An equalizing chuck as set forth in claim 14 wherein the V-shaped opening has a linear surface, the linear surface and the size of the bearing act to regulate the radial displacement of adjacent segments.

16. An equalizing chuck as set forth in claim 14 wherein the V-shaped opening has a curvlinear surface, the curvlinear surface and the size of the bearing act to regulate the radial displacement of adjacent segments.

* * * * *

UNITED STATES PATENT AND TRADEMARK OFFICE
CERTIFICATE OF CORRECTION

PATENT NO. : 5,941,538
DATED : August 24, 1999
INVENTOR(S) : Ralph J. Gonnocci

It is certified that error appears in the above-identified patent and that said Letters Patent are hereby corrected as shown below:

Column 5, line 32, "fall" should read -- full --; and
Column 8, Claim 12, line 14, before "said actuator", insert -- to --.

Signed and Sealed this

Twenty-seventh Day of June, 2000

Attest:

Q. TODD DICKINSON

*Attesting Officer*          *Director of Patents and Trademarks*